(12) United States Patent
Rogers et al.

(10) Patent No.: US 8,726,762 B2
(45) Date of Patent: May 20, 2014

(54) TUNABLE MASS DAMPER FOR USE WITH A REACTION WHEEL ASSEMBLY

(75) Inventors: Zach Rogers, Phoenix, AZ (US); Ryan Goold, Phoenix, AZ (US); Mario Gonzalez, Glendale, AZ (US)

(73) Assignee: Honeywell International Inc., Morristown, NJ (US)

( * ) Notice: Subject to any disclaimer, the term of this patent is extended or adjusted under 35 U.S.C. 154(b) by 967 days.

(21) Appl. No.: 12/825,109

(22) Filed: Jun. 28, 2010

(65) Prior Publication Data

US 2011/0314958 A1 Dec. 29, 2011

(51) Int. Cl.
*F16F 15/16* (2006.01)

(52) U.S. Cl.
USPC .............. 74/573.13; 384/99; 188/378

(58) Field of Classification Search
USPC ........... 188/378–380; 267/136; 74/5.5, 573.1, 74/573.13; 244/170
See application file for complete search history.

(56) References Cited

U.S. PATENT DOCUMENTS

| | | | |
|---|---|---|---|
| 3,495,459 A | | 2/1970 | McLean |
| 3,716,206 A | | 2/1973 | Lynch et al. |
| 3,742,769 A | * | 7/1973 | Crutcher et al. ............ 74/5 R |
| 3,980,358 A | * | 9/1976 | Davis ............................ 384/99 |
| 4,432,253 A | | 2/1984 | Kerlin |
| 4,892,174 A | | 1/1990 | Takekado |
| 5,007,303 A | | 4/1991 | Okuzumi |
| 5,318,156 A | * | 6/1994 | Davis ............................ 188/298 |
| 5,390,554 A | * | 2/1995 | Silvent ........................... 74/5.12 |
| 5,474,263 A | * | 12/1995 | Ford et al. ..................... 244/165 |
| 5,829,319 A | | 11/1998 | Mokeddem |
| 5,927,678 A | | 7/1999 | Parr |
| 6,009,986 A | * | 1/2000 | Bansemir et al. ............ 188/380 |
| 6,471,453 B1 | | 10/2002 | Winebrenner et al. |
| 6,634,472 B1 | * | 10/2003 | Davis et al. .................. 188/378 |
| 7,051,617 B2 | * | 5/2006 | Smith et al. ................. 74/573.13 |
| 2003/0188941 A1 | | 10/2003 | Davis et al. |
| 2003/0213672 A1 | | 11/2003 | Janson et al. |
| 2009/0255368 A1 | | 10/2009 | Kiener et al. |

FOREIGN PATENT DOCUMENTS

| | | |
|---|---|---|
| DE | 4209625 A1 | 9/1993 |
| WO | 9727408 A1 | 7/1997 |

OTHER PUBLICATIONS

EP Search Report, EP 11170822.8-2422 dated Nov. 10, 2011.
EP Communication, EP 11 170 822.8-2422 dated Oct. 28, 2011.

* cited by examiner

*Primary Examiner* — Christopher Schwartz

(74) *Attorney, Agent, or Firm* — Ingrassia Fisher & Lorenz, P.C.

(57) ABSTRACT

A tunable mass damper (TMD) is provided that can be coupled to a rotating inertia apparatus such as a reaction wheel assembly (RWA). The TMD includes a housing that contains a flexure, a mass, and damping fluid within the housing. The housing is coupled to the flexure, and the flexure is coupled to the mass. The mass is free to sway in the damping fluid. The damping fluid envelops the mass and provides damping between the mass and the housing. At least one of the mass, flexure and the damping fluid can be adjusted to tune the TMD to produce a resonance at or near a mode that is to be mitigated by the TMD such that it operates at a desired or optimal operating frequency.

20 Claims, 9 Drawing Sheets

TUNABLE MASS DAMPER FOR USE WITH A REACTION WHEEL ASSEMBLY

TECHNICAL FIELD

The present invention generally relates to vibration mitigation, and more particularly relates to a tunable mass damper for use with Attitude Control Systems (ACSs).

BACKGROUND

Spacecraft, satellites, or other vehicles in orbit experience a number of factors such as aerodynamic drag that can cause undesirable changes in attitude. Attitude control systems (ACSs) are often utilized to control/adjust the attitude of a spacecraft, satellite, or other vehicle. Such ACSs can include various rotating inertia members such as reaction wheel assemblies (RWAs), control momentum gyroscopes (CMGs) and similar actuators.

A RWA is a type of attitude control device that can be used in attitude control systems to exchange angular momentum with a space vehicle. A reaction wheel assembly typically includes a very large and heavy flywheel that is fixed in a body frame or housing. An electric motor is used to produce a torque along a spin axis of the flywheel so that the flywheel rotates to produce a force that opposes motion in one plane. The electric motor and wheel are supported on a rotor that acts like an axle. The rotor is positioned between bearings located at opposing ends of the rotor so that the rotor is allowed to spin within bearings.

A CMG is another type of attitude control device that can be used in attitude control systems. A CMG usually includes a spinning rotor (e.g., flywheel) and one or more motorized gimbals that tilt the rotor's angular momentum. As the rotor tilts, the changing angular momentum causes a gyroscopic torque that rotates the spacecraft. The spin axis of the CMG can be changed by moving the rotor using the gimbal assembly. The torque produced is orthogonal to the spin axis and the gimbal axis. CMGs differ from RWAs in that the latter applies torque simply by changing rotor spin speed, but the former tilts the rotor's spin axis without necessarily changing its spin speed. In general, CMGs are more power efficient.

During launching and/or ascent of a spacecraft vibrations and/or harmonic forces are generated that result in loads that are distributed throughout the load-bearing structure of the spacecraft and its subsystems and components. A portion of these forces are imparted at the bearings of the RWA or CMG, and if the forces exceed the levels that the bearings were designed to accommodate, the bearings could be overstressed.

As the size of the rotor used in a RWA/CMG increases, loading on the bearings during launching also increases. It would be desirable to reduce the loads on the bearings even though rotor size has increased.

To handle the increased forces and torques on the bearings, some RWAs/CMGs simply increase the size of the bearings. However, this is not an option or is undesirable in many RWAs/CMGs. The use of bulkier, heavier bearings not only increases the mass/size of the RWA/CMG, it also increases drag torque on the shaft of a RWA/CMG, which can increase power requirements and decrease the life of the RWA/CMG. As such, it is often desirable to use smaller bearings since they generally have lower friction drag. Smaller bearings can also increase the life of the bearings.

When smaller bearings are used in RWAs/CMGs, a mechanism is needed to ensure that forces and torques on the bearings do not exceed their operating capabilities. As such, there is a need to reduce the loading on the smaller bearings to acceptable levels while maintaining high margins and reliability.

BRIEF SUMMARY

In accordance with one embodiment, a system is provided comprising a tunable mass damper (TMD) that is physically coupled to a reaction wheel assembly (RWA). The TMD includes a housing that contains a flexure, a mass, and damping fluid within the housing. The housing is coupled to the flexure, and the flexure is coupled to the mass. The mass is free to sway in the damping fluid. The damping fluid envelops the mass and provides damping between the mass and the housing. In one implementation, at least one of the mass, flexure and the damping fluid can be adjusted to tune the tunable mass damper to produce a resonance at or near a mode that is to be mitigated by the TMD such that it operates at a desired or optimal operating frequency.

Other desirable features and characteristics of the present invention will become apparent from the subsequent detailed description of the invention and the appended claims, taken in conjunction with the accompanying drawings and the background of the invention provided above.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. As used herein, the word "exemplary" means "serving as an example, instance, or illustration." Any embodiment described herein as "exemplary" is not necessarily to be construed as preferred or advantageous over other embodiments. Furthermore, there is no intention to be bound by any theory presented in the preceding background or the following detailed description. In this regard, although a tunable mass damper (TMD) that is described herein is described as being implemented in conjunction within a reaction wheel assembly (RWA), it will be appreciated that this is merely exemplary, and that the TMD could be used in numerous and varied devices, systems, and contexts including, for example, in conjunction with other rotating inertia members such as control moment gyros (CMGs), energy storage flywheel systems, etc.

Figure 1:
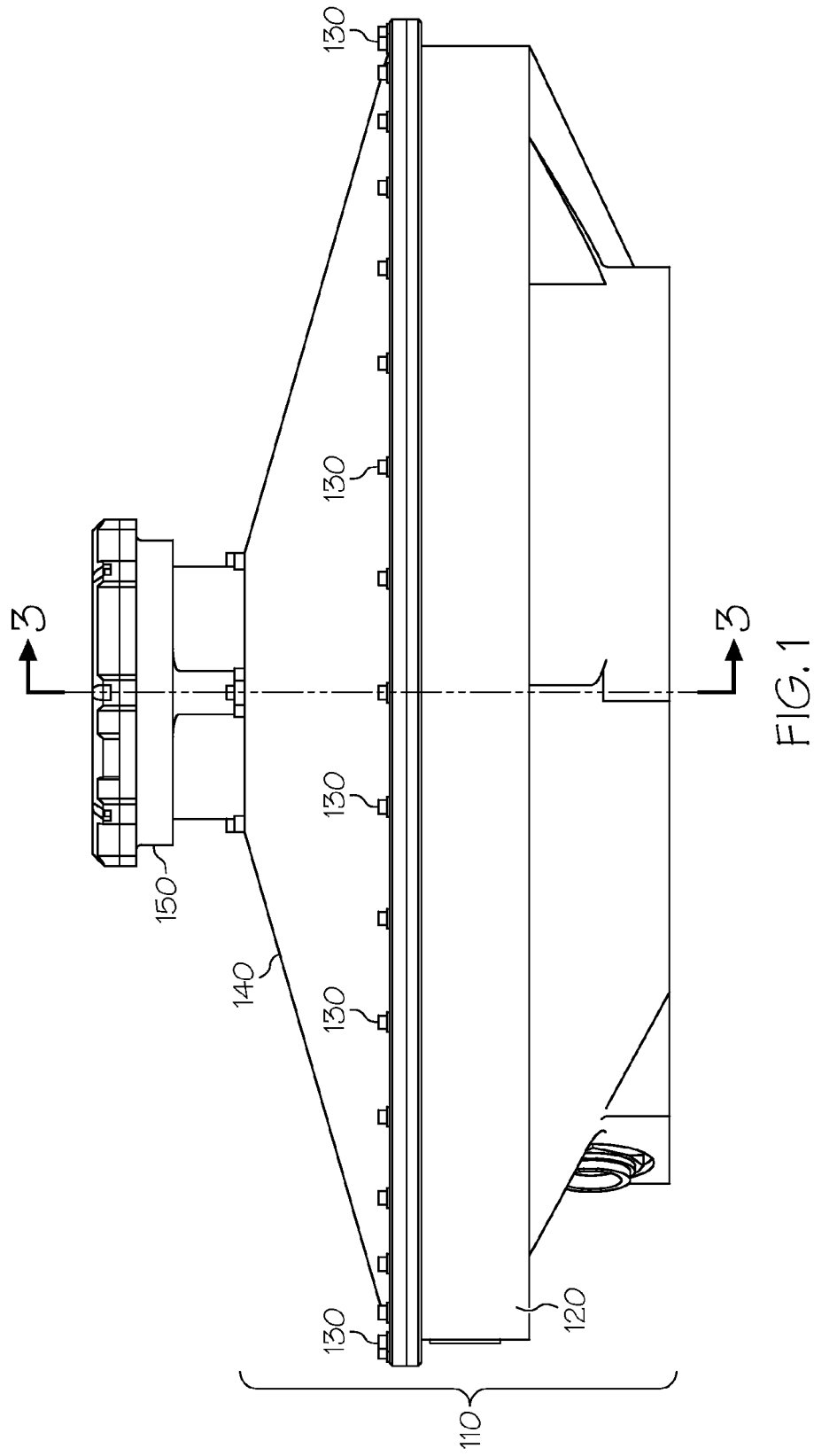
FIG. 1 is an elevation view of an assembly that comprises a reaction wheel assembly (RWA) and an external tunable mass damper (TMD) in accordance with some of the disclosed embodiments.
Figure 2:
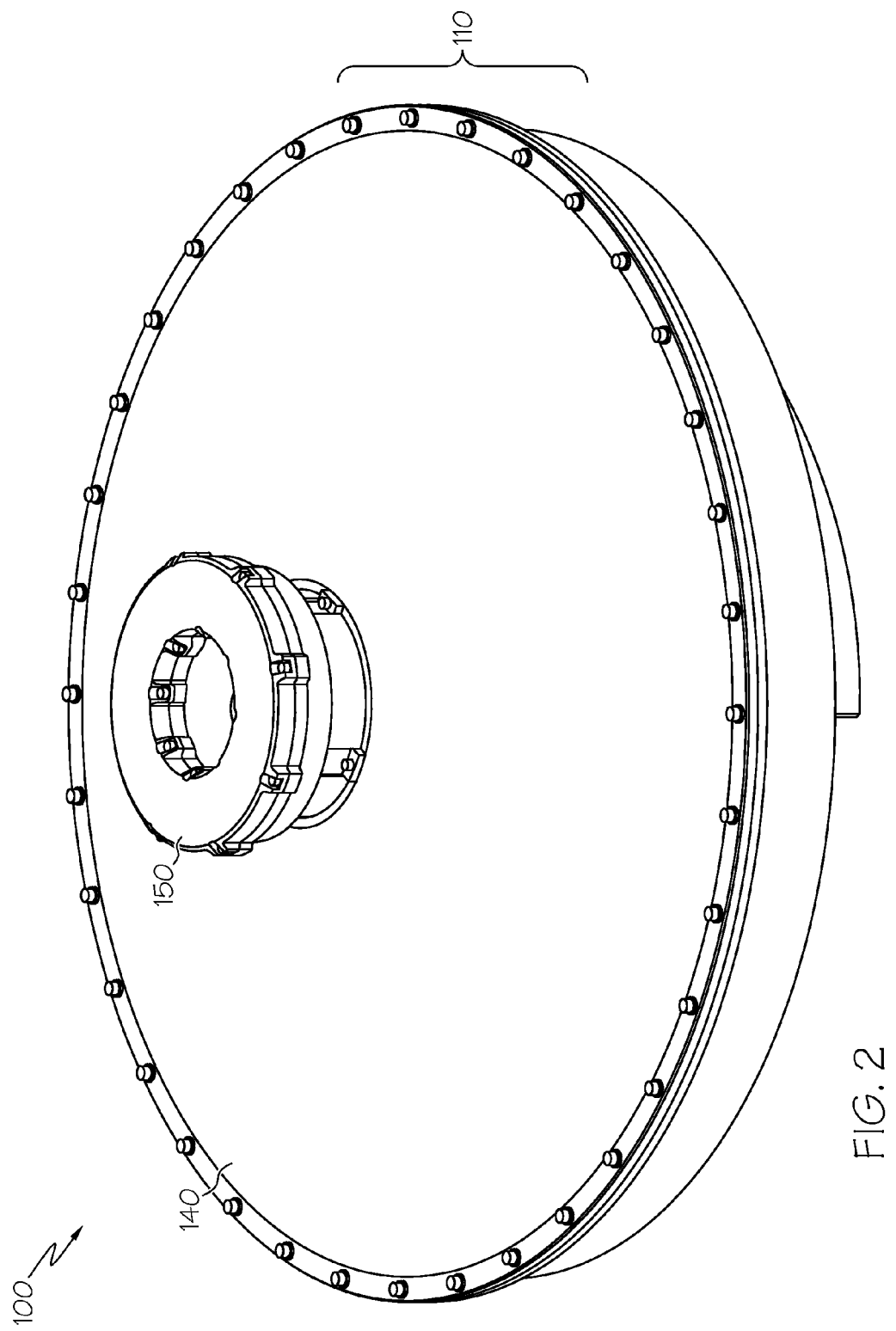
FIG. 2 is an exterior side auxiliary view of the RWA and TMD of FIG. 1.

FIG. 1 is an elevation view of an assembly 100 that comprises a reaction wheel assembly (RWA) 110 and an external tunable mass damper (TMD) 150 in accordance with some of the disclosed embodiments. FIG. 2 is an exterior side auxiliary view of the RWA 110 and TMD 150 of FIG. 1.

Figure 3:
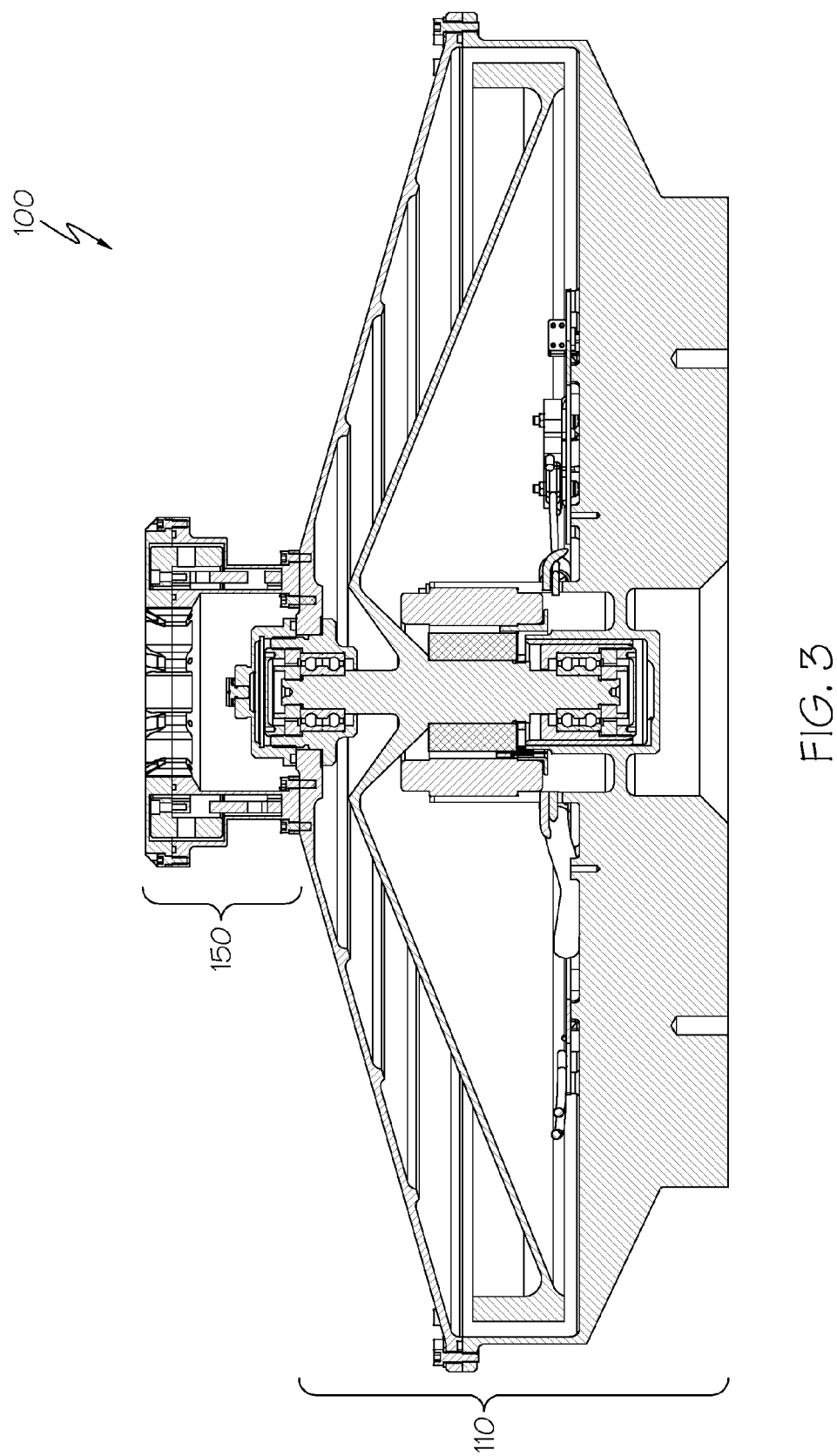
FIG. 3 is a cross-sectional view of the RWA and TMD of FIG. 1 taken along 3-3 of FIG. 1.

FIG. 3 is a cross-sectional view of the RWA 110 and TMD 150 of FIG. 1 taken along 3-3 of FIG. 1. The exterior housing of the RWA 110 includes a case 120 (or lower housing) and a cover 140 (or upper housing) that are coupled together using a plurality of fasteners, such as screws 130. In one implementation, the case 120 and cover 140 can be fabricated from a metal such as aluminum. More details regarding the internal structure of the RWA 110 will be described below with reference to FIG. 6.

Figure 4:
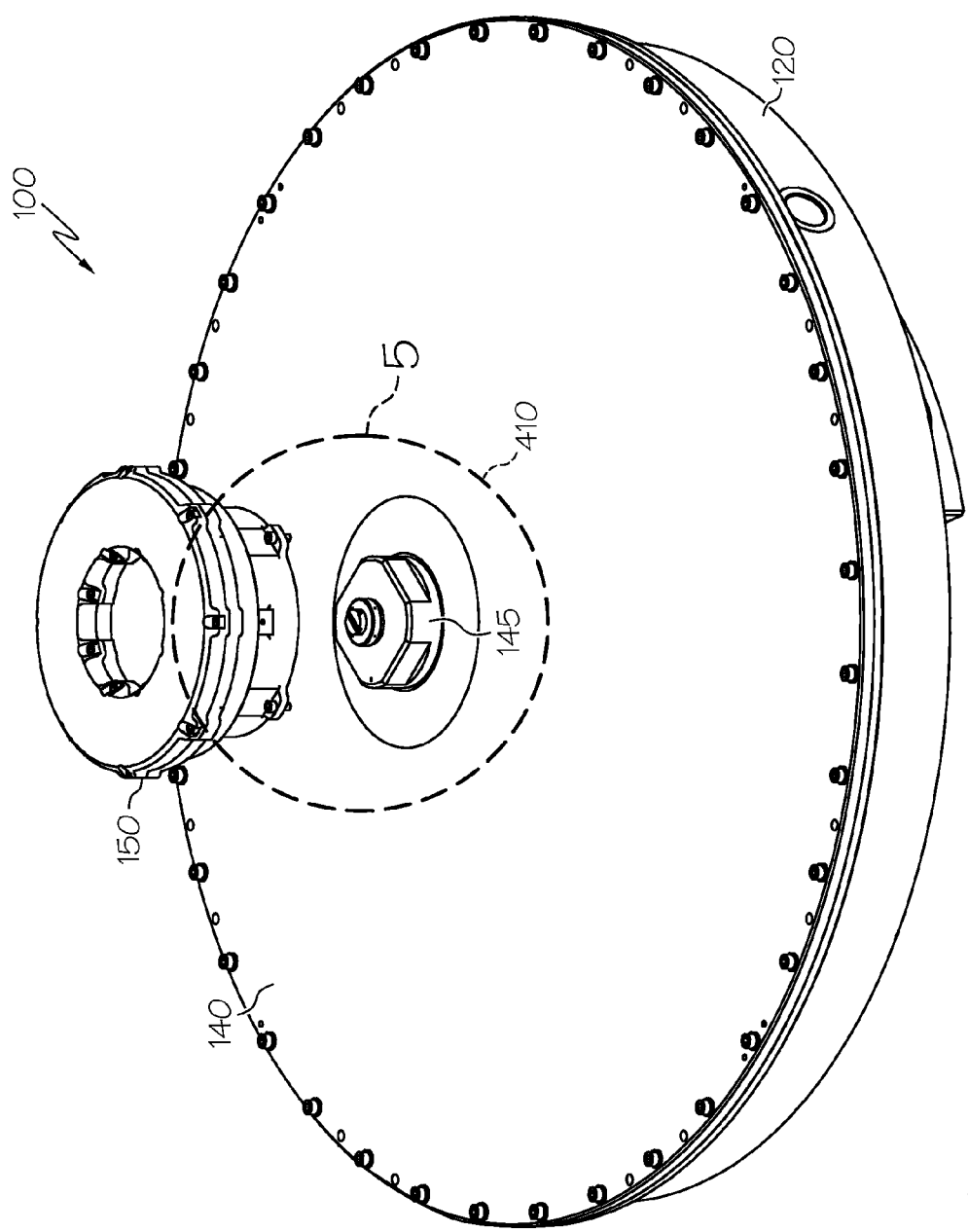
FIG. 4 is an exterior side auxiliary view showing the TMD prior to attachment to the RWA.

FIG. 4 is an exterior side auxiliary view showing the TMD 150 prior to attachment to the RWA 110. As shown, the cover 140 of the RWA 110 may include an evacuation port 145 that provides an entry point for the RWA to be evacuated as needed. The area marked in the dashed-line circle 410 is illustrated in greater detail in FIG. 5.

Figure 5:
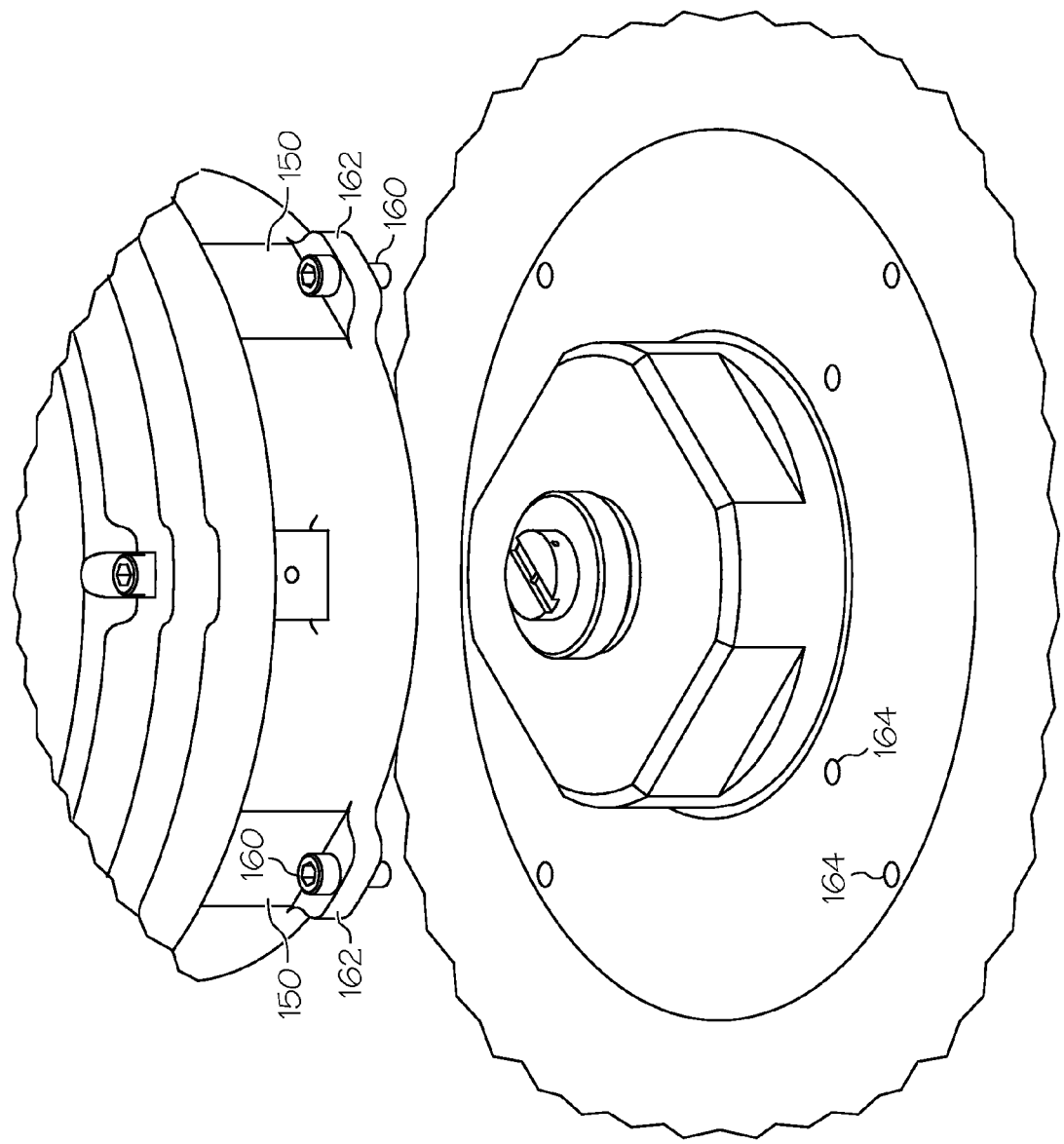
FIG. 5 is an exploded exterior side auxiliary view of the TMD just prior to attachment to the RWA.

FIG. 5 is an exploded exterior side auxiliary view 410 of the TMD 150 just prior to attachment to the RWA 110. As shown, the TMD 150 includes a plurality of flanges 162. The cover 140 of the RWA 110 includes a plurality of threaded holes 164. As illustrated in FIGS. 1-3, the housing base 152 of the TMD 150 is coupled or fastened in a stationary position on the cover 140 of the RWA 110 with screws 160. To install the TMD 150 and attach it to the cover 140 of the RWA 110, screws 160 are inserted through the flanges 162 and into the threaded holes 164 to secure the TMD 150 to the RWA 110.

Figure 6:
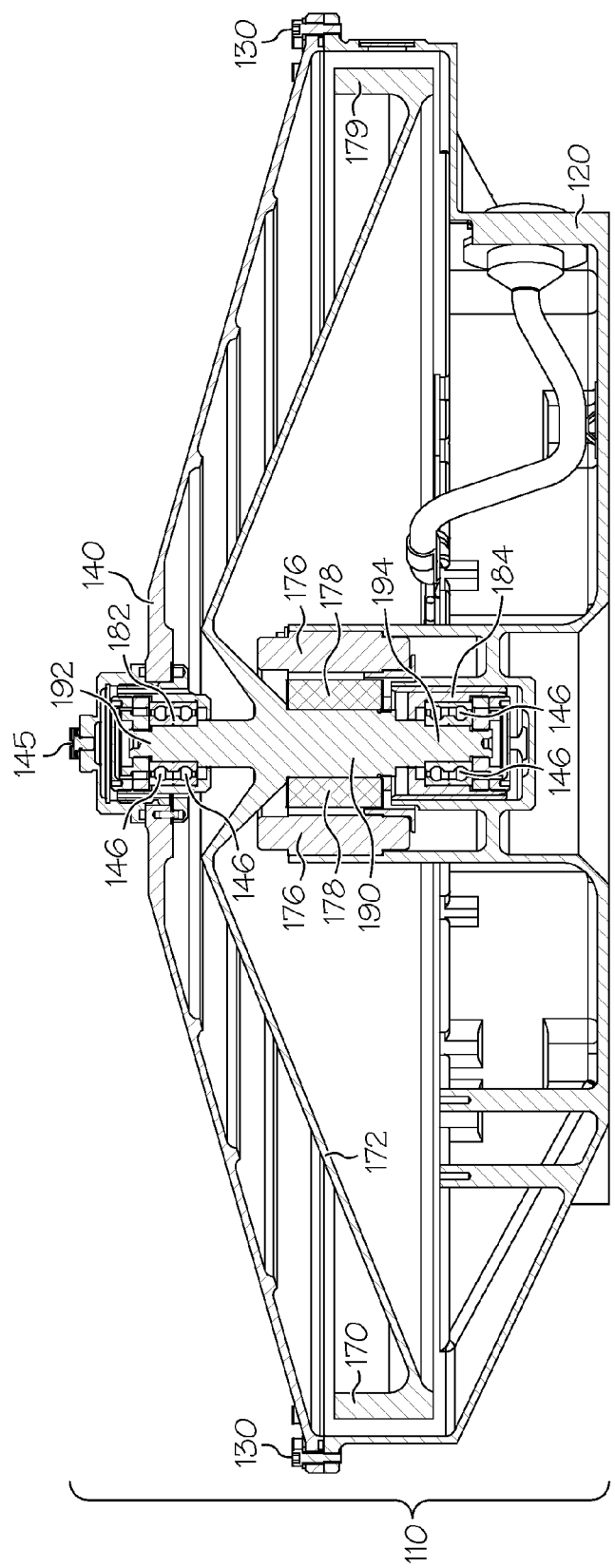
FIG. 6 is a cross-sectional view of the RWA of FIG. 1 prior to attachment of the TMD.

FIG. 6 is a cross-sectional view of the RWA 110 of FIG. 1 taken along 3-3 of FIG. 1 prior to attachment of the TMD 150 (without the TMD 150 present).

The RWA 110 of FIG. 6 includes a motor (e.g., a permanent magnet brushless DC motor) and a flywheel 170 disposed within a housing assembly 120, 140.

The flywheel 170 includes a rotor shaft 190, rotor suspension webs 172 and rotor web rings 179. The flywheel 170 is rotationally mounted within the housing. The rotor shaft 190 has a proximal end, a distal end, and a body between the proximal and distal end. The body of the rotor shaft 190 defines an axis of rotation.

The motor is mounted within the housing assembly 120, 140 and includes a rotor 178 and a stator 176. The rotor 178 is coupled to the flywheel 170 and is configured to rotate the flywheel 170 in response to electromagnetic excitation generated in the stator 176. The stator 176 surrounds at least a portion of, and preferably the entirety of, the rotor 178. The stator 176 is coupled to be appropriately energized from a distribution bus (not illustrated) under control of a motor control unit (not illustrated) that can be disposed, partially or entirely, within the housing assembly 120, 140 or external thereto. The rotor 178 of the motor is mounted around the rotor shaft 190. The motor is used to provide a mechanical torque necessary to rotate the flywheel 170 about the axis of rotation. Because the motor rotor 178 is coupled to the flywheel 170 it is driven thereby at the same rotational speed.

The RWA also includes several bearings 146 in a fixed upper bearing assembly 182 and a floating lower bearing assembly 184, which are located proximate the upper and lower ends 192, 194 of the rotor shaft 190, respectively. The flywheel 170 is rotationally mounted within the housing assembly 120, 140 via the fixed upper bearing assembly 182 and the floating lower bearing assembly 184. The bearings 146 are positioned generally at the distal end and proximal end of the rotor shaft 190, and help stabilize the rotor shaft 190. In one implementation, the bearing assemblies 182, 184 are held in a stainless steel cartridge, and have a diameter between approximately 1.1024 and approximately 2.0472 inches. The bearings 146 allow the rotor 178 to rotate, while constraining it within the housing and minimizing travel or floating in the axial directions.

In addition to the main housing (i.e., case 120 and the cover 140), the RWA 110 includes an evacuation port 145 (e.g., a valve) connected to the cover 140 with a housing cap.

Other details regarding other reaction wheel assemblies are disclosed in U.S. Pat. No. 5,474,263, entitled "Reaction wheel and method of safing wheel," assigned to the assignee of the present invention, its contents being incorporated by reference in its entirety herein.

Figure 7:
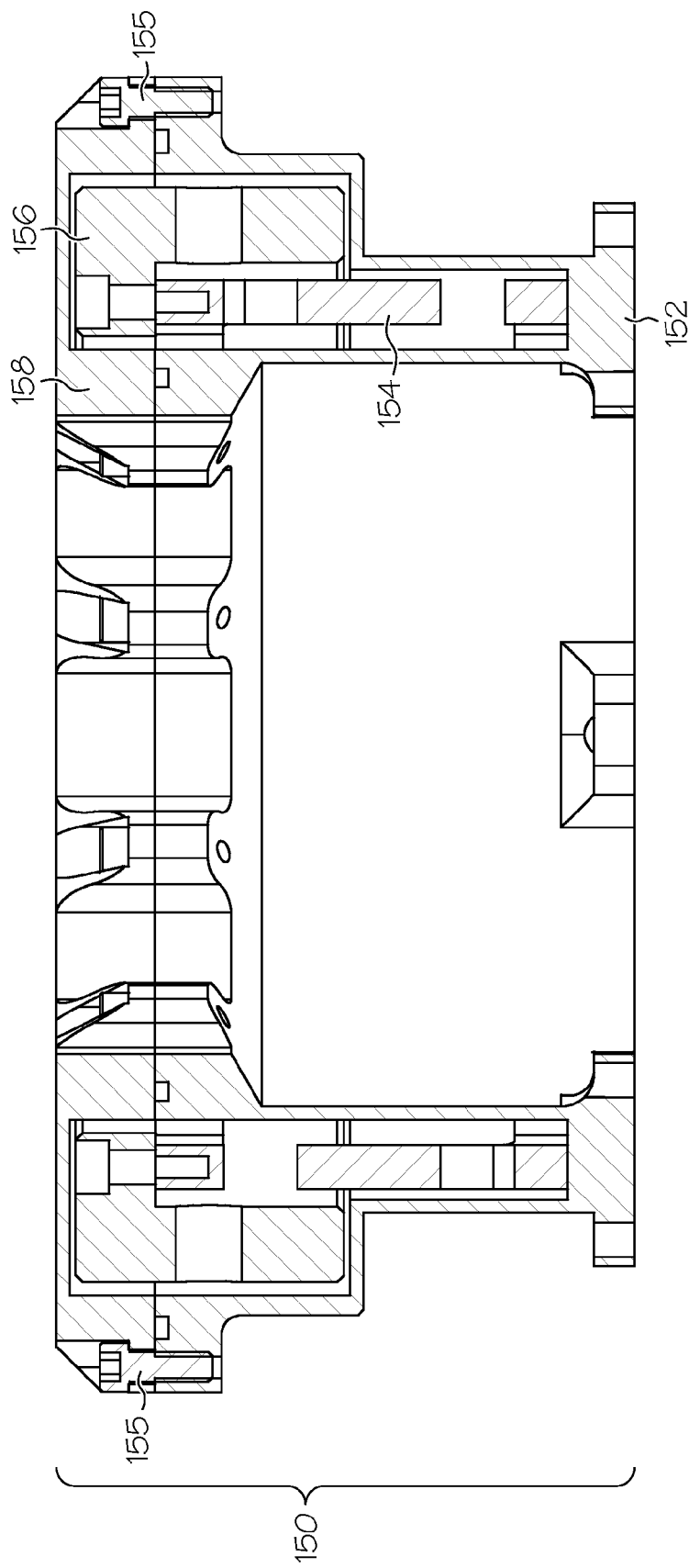
FIG. 7 is a cross-sectional view of the TMD of FIG. 1 taken along 3-3 of FIG. 1 without the RWA present in accordance with some of the disclosed embodiments.
Figure 8:
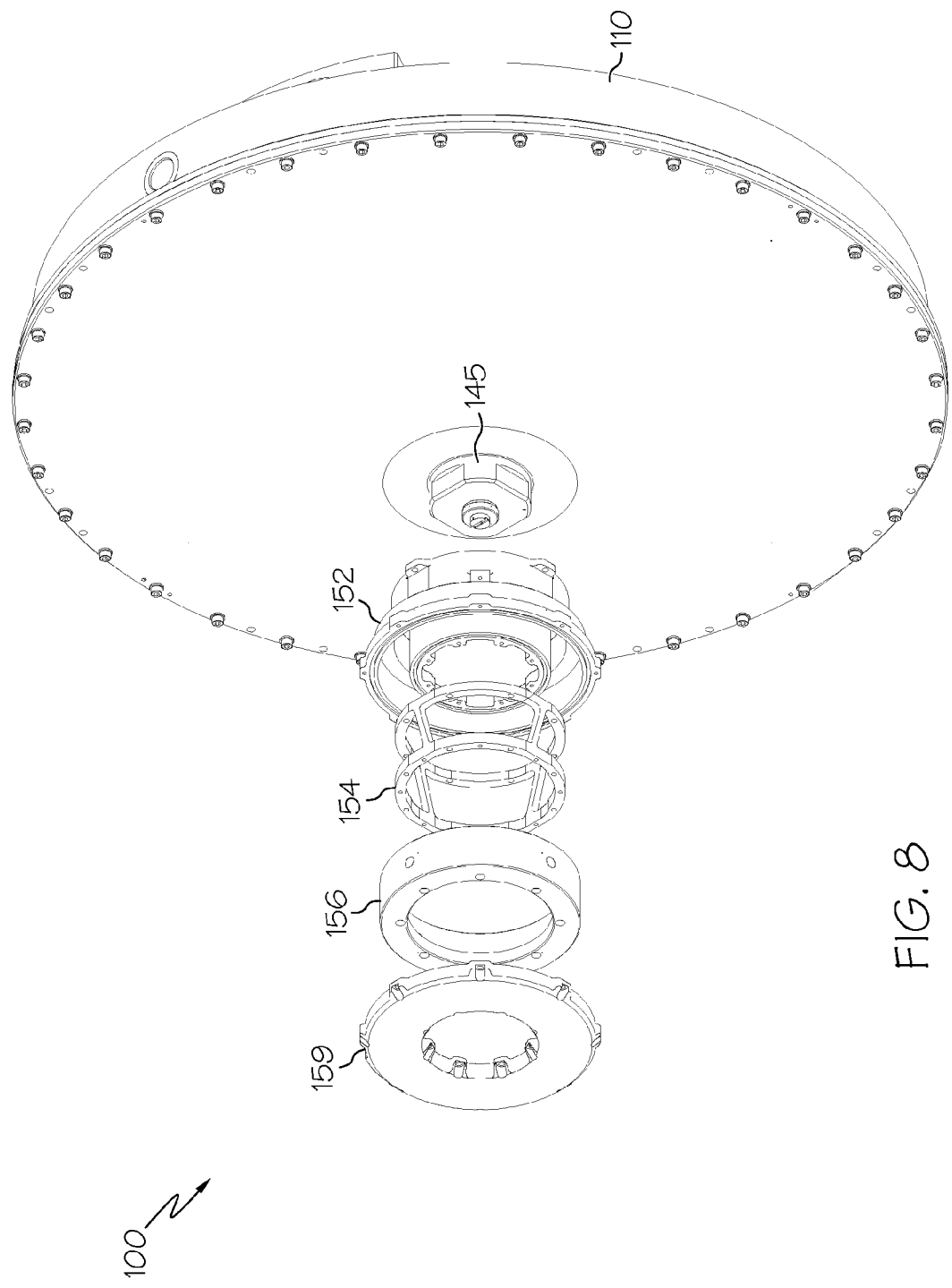
FIG. 8 is an assembly view of the various elements of the TMD in accordance with some of the disclosed embodiments.

FIG. 7 is a cross-sectional view of the TMD 150 of FIG. 1 taken along 3-3 of FIG. 1 without the RWA 110 present (e.g., prior to attachment of the TMD 150 to the RWA 110). FIG. 8 is an assembly view of the various elements 152-158 of the TMD 150. As shown in FIGS. 7 and 8, the TMD 150 comprises a housing that includes a housing base 152 and a housing cap 158, a flexure 154 and a mass 156. Prior to describing the various elements of the TMD 150 in greater detail, it is noted that the TMD is a passive damping device in that does not include any rotating parts that rotate with respect to the remainder of the assembly 100.

The housing base 152 is coupled to clearance holes of housing cap 158 using fasteners such as screws 155 to create a hermetically-sealed volume or vessel for the flexure 154, mass 156 and silicone or other damping fluid (not illustrated).

In one non-limiting implementation, the housing base 152 is cylindrical in shape, and includes multiple outer and inner flanges 162 used to attach the housing base 152 to the RWA 110. The top portion of the housing base 152 has a flange with an o-ring to ensure a hermetic seal within the system when the assembly is filled with damping fluid. A fill port can be located on the side of the housing base 152 to ensure proper filling of the unit with the damping fluid. The fill port can be hermetically sealed using an aluminum ball and setscrew. A plurality of threaded holes are located in the internal and external portion of the top flange to accommodate assembly of the housing cap 158 onto the housing base 152. The housing base 152 provides one of the sheer plates that interact with the mass, to create damping within the system. In one non-limiting implementation, the housing base 152 is fabricated from a metal, such as aluminum 6061-T6, and has a diameter of approximately 4.95 inches and a length of approximately 1.803 inches. When the material is one such as aluminum, there are little or no difficulties with the lathing and milling of the part.

In one non-limiting implementation, the housing cap 158 is disc-shaped and is coupled to the housing base 152 using a plurality of hardware at the internal and external portions of the flange. The housing cap 158 provides the secondary, and greater, sheer plate which partially defines the damping of the system. In one non-limiting implementation, the housing cap 158 is fabricated from a metal, such as aluminum 6061-T6, and has a diameter of approximately 4.95 inches and a length of approximately 0.370 inches. When the material is one such as aluminum, there are little or no difficulties with the lathing and milling of the part.

The flexure 154 is coupled to the housing 152, 158 using screws (not illustrated), and functions to provide the stiffness of the TMD 150. As used herein, the term "stiffness" refers to the resistance of an elastic body to deformation by an applied force. The stiffness, k, of an elastic body is a measure of the resistance offered by the elastic body to deformation (bending, tension or compression). In one implementation, the flexure 154 has a cylindrical shape with cut-out portions that define diagonal beams. The diagonal beams provide the necessary x-axis and y-axis lateral stiffness, while keeping a z-axis translational stiffness and torsional stiffness (e.g., the z-axis moment stiffness) significantly larger than the damping-producing axes. As used herein, the term "translational stiffness" refers to any stiffness that is parallel to the axis, whereas the term "rotational stiffness" refers to any stiffness that is acting rotationally, using x, y and z as the rotational axis, where the x and y axes can be either lateral axis, and the z-axis is orthogonal to the x and y axes. In one non-limiting implementation, the flexure 154 is fabricated from a machined metal such as aluminum 2024-T351, and has a dimensional envelope of 3.50 inch diameter by 1.55 inch length. The flexure 154 is fabricated using standard machining operations and when the material is one such as aluminum, there are no difficulties with the lathing and milling of the part.

The mass 156 can generally have any shape, dimensions, mechanical properties or other structural features that depend on the specific implementation. In one non-limiting implementation, the mass 156 can be a disk-shaped object, a ring-shaped object, a toroid-shaped object, or any other object having an annular shape generated by revolving a geometrical figure around an axis external to that figure. The mass 156 consists of four holes that are located on each quadrant of its side. These holes are used to allow tuning of the unit by pressing in various density material to increase the mass, or by removing more tungsten alloy volume to decrease the mass to attain better performance within the system. When fully assembled, the upper flat works in conjunction with the housing cap to provide damping within the system, and the lower flat works in conjunction with the housing base to provide damping within the system. In one non-limiting implementation, the mass 156 is fabricated from a metal, such as tungsten or a tungsten alloy, and has a dimensional envelope of approximately 4.12 inches in diameter by 1.00 inch in length. The mass, being an extremely dense material, is more difficult to fabricate compared to the other parts in the system made of aluminum. Extra care would be needed from the machinist to ensure the proper milling and lathing bits are used to properly machine the part.

The flexure 154 is surrounded by the mass 156 of the TMD 150, and the mass 156 can be attached to the flexure 154 via screws (not illustrated). In one implementation, the TMD 150 is assembled by attaching the flexure 154 and mass 156 to the housing base 152. The housing cap 158 can then be torqued onto the housing base 152 to hermetically seal the housing of the TMD 150.

The housing base 152 includes a fill-port (not shown) that allows a damping fluid to be filled into the TMD 150 after it is assembled. The damping fluid provides viscous damping between the flat surfaces of the mass 156 and housing 152, 158, and in one implementation can be silicone fluid or silicone-based fluid. As will be explained further below, the TMD 150 employs a damping fluid to damp certain structural modes of the RWA 110.

Operation of the TMD

During launch of a vehicle (e.g., spacecraft), vibrations excite lateral or rocking modes of the rotor of the RWA 110. These lateral or rocking modes refer to the rotor's natural tendency to rotate about two of the three axes (e.g., if the x-axis were aligned to the rotor's spin axis, then the rotor's lateral or rocking modes occur about the y-axis and the z-axis.) Because the lateral or rocking modes are the primary loads into the bearings (i.e., have the most influence or contribution to the loads the bearings), it is desirable to reduce these modes.

To reduce these modes, the TMD 150 applies a force that cancels a portion of the excitation force during launch, which means lower forces and torques occur at the bearings. More specifically, the TMD 150 attenuates the rotor rocking resonance of the RWA 110 by applying a reactive force through the case cover to the spin bearings and rotor shaft. The reacting force of the TMD 150 is produced by the excitation of its mass 156 and accompanying flexure 154 stiffness by the rotor rocking motion. (It is noted that the TMD 150 uses a mass 156 smaller than the RWA 110 on which it is mounted to produce a resonant frequency near that of the mode it is trying to counteract.) Inspection of a typical response curve of a system with a resonance and a TMD shows two response peaks at reduced amplitudes with frequencies surrounding the unmitigated resonant frequency. The damping fluid acts to damp lateral or rocking modes that occur during launch or ascent of the vehicle and thus reduce the two response peaks of the combined dual-mode resonant system.

The efficacy of the TMD 150 is determined by (1) the proximity of its damped natural frequency to the rotor excitation frequency, (2) the amount of damping generated in the shearing of the damping fluid, and (3) its mass. As will now be described below, the damped natural frequency of the TMD 150 can be tuned so that it is near the natural frequency of the rotor's structural modes (i.e., rocking or lateral modes), and the damping fluid can be adjusted to change the amount of damping.

Tuning the TMD

Prior to attaching the TMD 150 to the RWA 110, the TMD 150 can be tuned to alter the target damping, stiffness, and/or frequency to help ensure that the TMD 150 reduces the modes in an optimal manner. To tune the TMD 150, a variety of different parameters of the TMD 150 that can be changed or altered, including, for example, the physical mass of the mass 156, stiffness of the flexure 154, and the viscosity of the damping fluid. One or more of these parameters can be altered while keeping one or more of the other parameters constant.

The flexure 154 allows a stiffness (Ka) parameter to be adjusted or tuned for a particular implementation. For example, the flexure 154 can be re-machined to create a flexure 154 with a different stiffness that fits in the same housing. To facilitate altering of the stiffness of the TMD 150, the flexure 154 is made of a material that can be easily machined (e.g., Aluminum 6061). This way it is relatively easy to alter the existing flexure 154 in little time.

The damping constant (c) parameter of the TMD 150 can be tuned by increasing or decreasing the damping constant (c) of the viscous fluid. In other words, the viscosity of the damping fluid can be changed to increase or decrease the damping effects. This could be done, for example, by draining the viscous fluid and remixing it so that it has a new viscosity.

Increasing or decreasing the mass 156 affects the damped natural frequency, the damping constant (c) parameter, and flexure stiffness. As such, increasing or decreasing the mass 156 allows the damped natural frequency, the damping constant (c) parameter, and flexure stiffness to be adjusted or tuned for a particular implementation. To tune the damped natural frequency of the TMD 150 rotational modes (i.e. about the same axis as the rotor as defined in my prior comment above), the weight of the mass 156 can be increased or decreased as shown in FIG. 9.

Figure 9:
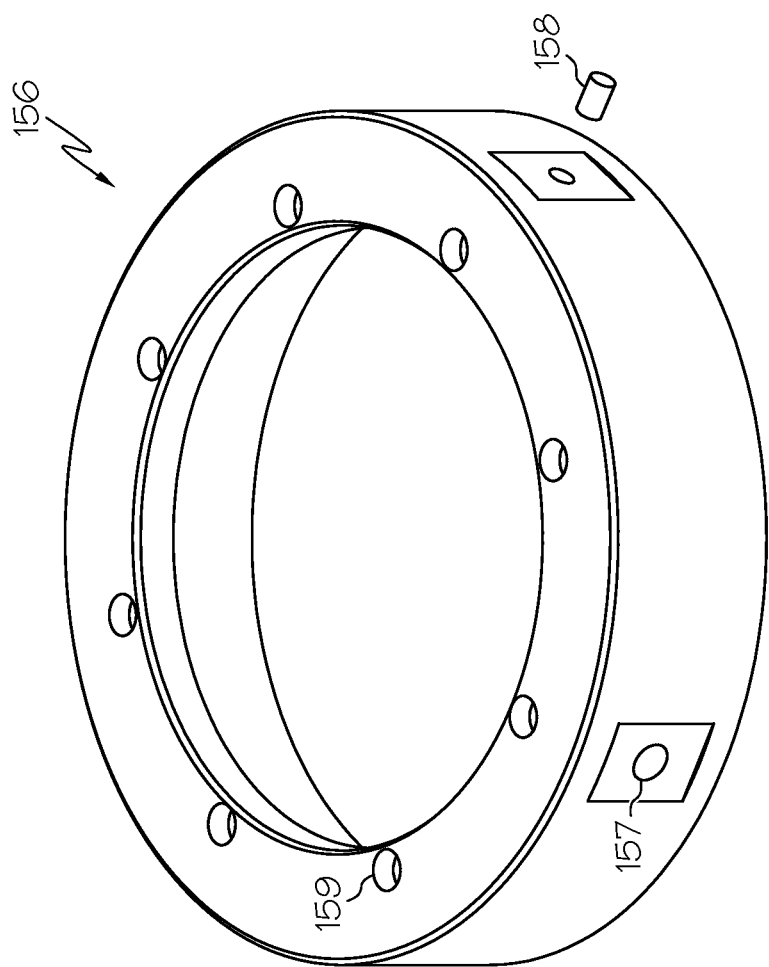
FIG. 9 is an exterior side auxiliary view showing the mass of the TMD in accordance with some of the disclosed embodiments.

FIG. 9 is an exterior side auxiliary view showing the mass 156 of the TMD 150 in accordance with some of the disclosed embodiments. To alter/tune the frequency of the TMD, the mass 156 of the TMD 150 has N pre-drilled holes 157 (e.g., in each quadrant). The pre-drilled holes 157 can be drilled to a larger size to decrease the weight of mass 156. In other words, the size of the pre-drilled holes 157 can be increased to further decrease the weight of 156. To increase the weight of the mass 156, any number of plugs 158 can be inserted (or press-fit) into the pre-drilled holes 157 in the mass 156. The particular material used to create the plugs 158 can vary depending on the implementation and the increase in weight that is desired. The plugs 158 can be made of any material with whatever density that will increase the mass to a specific number to achieve the optimal mass.

The damping constant (c) parameter of the TMD 150 can also be tuned by increasing or decreasing the dimensional gap between the mass and the housing. In this regard, it is noted that replacing the nominal fluid with a different viscosity fluid is a much simpler operation than redesigning the mechanical components to alter the gap between the mass and housing.

In some other implementations, other components, such as portions of the housing (e.g., internal shelves of a housing cap and housing base can be altered or adjusted to tune the tunable TMD).

Any of the tuning techniques described above (or any combination of them) can be used to achieve proper tuning of the TMD 150.

CONCLUSION

During launch and/or ascent, rotor structural resonance places heavy loads on the bearings 146 used in the RWA 110. When the TMD 150 is installed on a RWA 110, the TMD 150 reduces/mitigates the launch forces and torques and reduces the energy communicated to the bearings 146. As a result, the bearings 146 will last longer, which increases the useful lifetime or survivability of the RWA 110. In addition, because loading on the bearings 146 is decreased, the RWA 110 can utilize smaller, high-performance bearings. Moreover, smaller bearings 146 have less drag, which means there is less drag torque and therefore the robustness of the ACS system is improved. In addition, the use of smaller bearings 146 reduces the overall cost.

Thus, by implementing the TMD 150 in conjunction with the RWA 110, smaller bearings 146 can be used in the RWA 110. As a result, the RWA 110 experiences less drag, and because drag torque is reduced, power consumption is also reduced. The smaller bearings 146 also have lower cost, and allow the total size of the RWA 110 to be decreased since the smaller bearings 146 take up less volume and are lighter in weight. In addition, because loading on the bearings 146 is decreased, the RWA 110 will last longer and need to be serviced less often.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An assembly, comprising:
   a reaction wheel assembly (RWA) comprising a rotor and a plurality of bearings that allow the rotor to rotate; and
   a tunable mass damper (TMD), externally mounted to the RWA, and being designed to reduce one or more of force and torque communicated to the bearings, the TMD comprising:
      a housing;
      a flexure disposed within the housing; and
      a mass disposed within the housing and supported by the flexure.

2. An assembly according to claim 1, wherein the flexure comprises diagonal beams that provide stiffness of the TMD.

3. An assembly according to claim 2, wherein the flexure comprises four diagonal beams that provide x-axis and y-axis translational stiffness, while maintaining a rigid z-axis translational stiffness and torsional stiffness.

4. An assembly according to claim 1, wherein the TMD further comprises damping fluid within the housing that provides damping between flat surfaces of the mass and the housing, and wherein the housing, of the TMD comprises:
   a housing base; and
   a housing cap coupled to the housing base, wherein the housing cap includes a fill-port in fluid communication with the sealed volume defined by the housing.

5. An assembly according to claim 4, wherein the housing base, the housing cap, and the flexure comprise aluminum, and wherein the mass comprises a tungsten alloy.

6. An assembly according to claim 1, wherein the RWA, comprises:
   an exterior housing comprising a case and a cover that are coupled together using a plurality of fasteners, wherein the rotor is disposed within the exterior housing and in contact with the bearings.

7. An assembly according to claim 1, wherein the cover of the RWA includes a plurality of threaded holes, wherein the TMD comprises a housing base including a plurality of flanges, and further comprising:
   a plurality of screws inserted through the plurality of flanges and into the plurality of threaded holes to secure the TMD to the cover of the RWA, wherein the cover of the RWA comprises an evacuation port that provides an entry point for the RWA to be evacuated, wherein the TMD surrounds the evacuation port.

8. An assembly according to claim 1, wherein the assembly is part of an attitude control system for a vehicle, wherein the TMD reduces one or more of force and torque that are communicated to the bearings when the vehicle is set in motion.

9. An assembly, comprising:
a reaction wheel assembly (RWA), comprising:
an RWA housing; and
a rotor mounted in the RWA housing for rotation about a spin axis; and
a tunable mass damper (TMD) mounted to the exterior of the RWA housing and configured to dampen vibrations along a first axis perpendicular to the spin axis and along a second axis perpendicular to the first axis and to the spin axis.

10. An assembly according claim 9 wherein the TMD comprises:
a mass; and
a flexure coupled between the mass and the RWA housing.

11. An assembly according to claim 10 further comprising a TMD housing in which the mass and flexure are disposed, the TMD housing configured to be filled with a damping fluid.

12. An assembly according to claim 11 wherein mass is exposed to the damping fluid when the TMD housing is filled therewith.

13. An assembly according to claim 11 wherein the TMD housing comprises:
a housing base defining a first sheer plate; and
a housing cap coupled to the housing base and defining a second sheer plate, the mass disposed between the first and second sheer plates.

14. An assembly according to claim 10 wherein the mass comprises a plurality of pre-drilled holes formed in an outer circumference thereof.

15. An assembly according to claim 14 further comprise a plurality of plugs inserted into the plurality of pre-drilled holes.

16. An assembly according to claim 10 wherein the flexure comprises:
a first lateral stiffness taken along the first axis;
a second lateral stiffness taken along the second axis; and
a translational stiffness taken along the spin axis, the translational stiffness greater than the first lateral stiffness and greater than the second lateral stiffness.

17. An assembly according to claim 10 wherein the flexure comprises a plurality of diagonal beams.

18. An assembly according to claim 10 wherein the mass surrounds at least a portion of the flexure.

19. An assembly according to claim 9 wherein the TMA is tuned to reduce a rocking mode of the rotor.

20. An assembly, comprising:
a rotating inertia member having a spin axis; and
a tunable mass damper (TMD), comprising:
a TMD housing mounted to the rotating inertia member and configured to be filled with a damping fluid;
a mass disposed within the TMD housing and exposed to the damping fluid when the TMD housing is filled therewith; and
a flexure coupled between the TMD housing and the mass, the flexure having a first lateral stiffness taken along a first axis perpendicular to the spin axis, a second lateral stiffness taken along a second axis perpendicular to the first axis and to the spin axis, and a translational stiffness taken along the spin axis and exceeding the first and second lateral stiffnesses.

* * * * *